(12) United States Patent
Piacentino

(10) Patent No.: US 9,957,140 B2
(45) Date of Patent: May 1, 2018

(54) LOG LOADING DEVICE

(71) Applicant: Mark Piacentino, Kennett Square, PA (US)

(72) Inventor: Mark Piacentino, Kennett Square, PA (US)

( * ) Notice: Subject to any disclaimer, the term of this patent is extended or adjusted under 35 U.S.C. 154(b) by 179 days.

(21) Appl. No.: 14/940,734

(22) Filed: Nov. 13, 2015

(65) Prior Publication Data

US 2016/0137118 A1    May 19, 2016

Related U.S. Application Data

(60) Provisional application No. 62/079,269, filed on Nov. 13, 2014.

(51) Int. Cl.
| | |
|---|---|
| *B66C 23/44* | (2006.01) |
| *B60P 1/43* | (2006.01) |
| *B60P 1/52* | (2006.01) |
| *B60P 3/41* | (2006.01) |
| *B65G 67/12* | (2006.01) |

(52) U.S. Cl.
CPC .............. *B66C 23/44* (2013.01); *B60P 1/435* (2013.01); *B60P 1/52* (2013.01); *B60P 3/41* (2013.01); *B65G 67/12* (2013.01)

(58) Field of Classification Search
CPC ........... B60P 1/435; B60P 1/52; B60P 1/6454; B60P 1/43; B60P 1/431; B60P 3/41; B60P 3/07; B65G 67/02; B65G 67/12; B66C 23/44; A01G 23/003; A01G 23/006
See application file for complete search history.

(56) References Cited

U.S. PATENT DOCUMENTS

| | | | | |
|---|---|---|---|---|
| 1,677,733 | A | * | 7/1928 | Schiftner ............... A01D 90/12 |
| | | | | 410/66 |
| 1,889,820 | A | * | 12/1932 | Butts .................... A01G 23/043 |
| | | | | 414/23 |
| 2,305,762 | A | * | 12/1942 | Cristofoletti ............ B60L 11/18 |
| | | | | 414/538 |

(Continued)

FOREIGN PATENT DOCUMENTS

CA    2565910    5/2007

OTHER PUBLICATIONS

Office Action dated Oct. 11, 2016 from the CIPO for Canadian Patent Application No. 2911908.

*Primary Examiner* — Glenn F Myers
(74) *Attorney, Agent, or Firm* — Mark T. Vogelbacker; Eckert Seamans Cherin & Mellott LLC

(57) ABSTRACT

A device for assisting in loading heavy objects onto the load platform of a vehicle, such as a pick-up truck, comprising a frame for locating a pulling point near or above a plane established by a ramp between the load platform and the surface on which the motor vehicle is resting. The device may be provided with a roller adjacent a rear end of the load platform for reducing friction between an object being loaded and the junction of the load platform and the ramp. A pulling line capable of being extended between the pulling point and an object being loaded may be provided such that the object may be pulled up the ramp and onto the load platform, with the position of the pulling point pulling the object upwards from the plane of the ramp and load bed, such that friction between the object and the ramp and load bed is reduced.

8 Claims, 5 Drawing Sheets

(56) References Cited

U.S. PATENT DOCUMENTS

| | | | | |
|---|---|---|---|---|
| 3,208,615 A | * | 9/1965 | Wolf | B60P 1/6454 |
| | | | | 280/43.18 |
| 3,263,845 A | * | 8/1966 | Davidson | B60P 3/1066 |
| | | | | 254/327 |
| 3,515,299 A | * | 6/1970 | Esser | B60L 11/18 |
| | | | | 254/2 R |
| 3,971,484 A | * | 7/1976 | Anderson | B60P 3/00 |
| | | | | 414/500 |
| 4,790,712 A | | 12/1988 | Batson | |
| 5,330,148 A | * | 7/1994 | Floyd | B60P 3/075 |
| | | | | 224/42.4 |
| 5,542,810 A | * | 8/1996 | Florus | B60P 3/1033 |
| | | | | 280/414.1 |
| 5,556,249 A | | 9/1996 | Heine | |
| 5,609,462 A | * | 3/1997 | Reimer | B60P 3/1025 |
| | | | | 224/310 |
| 8,366,373 B2 | * | 2/2013 | Wood | B60P 3/12 |
| | | | | 212/175 |
| 8,376,684 B2 | * | 2/2013 | Juarez-Ortega | B60P 3/1025 |
| | | | | 280/414.1 |
| 8,479,933 B2 | | 7/2013 | Vaquera | |
| 2004/0202533 A1 | * | 10/2004 | Haire | A61G 3/061 |
| | | | | 414/538 |
| 2009/0032784 A1 | * | 2/2009 | Bielat | B66D 3/00 |
| | | | | 254/133 R |
| 2010/0303595 A1 | * | 12/2010 | Duell | B60P 1/6454 |
| | | | | 414/491 |
| 2013/0181023 A1 | * | 7/2013 | Shawanda | B60R 9/06 |
| | | | | 224/403 |
| 2017/0174115 A1 | * | 6/2017 | Frost | B60P 3/06 |

* cited by examiner

LOG LOADING DEVICE

PRIORITY INFORMATION

The present application is a utility application, and claims priority to U.S. Provisional Application Ser. No. 62/079,269, filed on Nov. 13, 2014, titled Log Loading Device, in the name of Mark Piacentino, the contents of which are incorporated herein in its entirety by reference thereto.

BACKGROUND OF THE INVENTION

Choice hardwood lumber has significant value in many industries, including furniture and cabinet making. Such lumber may be milled from choice trees, having sufficient size and features to allow boards of adequate size to be milled from the tree. The type of tree itself is significant, as different types of trees yield differing coloring and grain. Pricing for the wood varies based on the wood type, such that some trees yield wood having significant value.

Logging operations are able to yield large quantities of wood, however typically require large and extensive machinery in order to harvest large volumes of timber, much of which is other than suitable for milling choice hardwood lumber, such as walnut and cherry boards. Choice hardwood lumber is often obtained on a single log basis, i.e., one particular tree is found which will yield choice hardwood lumber. Accordingly, the use of large and expensive equipment to retrieve single logs is not cost effective, and limit the ability of individual woodworkers and small operations from harvesting logs from which to mill choice hardwood lumber.

Logs from which choice hardwood lumber can be milled are typically several feet long, and of a large enough diameter that individuals are unable to easily load such logs onto a truck to retrieve the log from where it is found, and move it to a location where it can be milled. Such logs often weigh several hundred pounds, and accordingly, different methods of loading such logs into the bed of a pick up truck, frequently available to individual woodworkers, may use a frame to form an overhead crane to lift the logs, such as that shown in U.S. Pat. No. 4,790,712 and allow a truck to be backed under the log, at which point the log may be lowered onto the bed of the truck. Obviously, such structure is inefficient in that it must be transported to a site where a log has been found, removed from the truck and set up for lifting a log, used to load the log into the bed of the truck, then broken down and placed back into the truck, which now also has the loaded log or logs also in the bed. Other methods, such as using a jib crane such as shown in U.S. Pat. No. 8,479,933 have also been used, and which while removing the set up inefficiencies, are limited in load capacities by having to be mounted at a corner of the truck bed to allow clearance for the log being lifted, resulting in high local loads, and imbalancing of the truck onto which the jib crane is mounted.

Accordingly, there is a need for the ability of small wood harvesting operations, such as those associated with choice hardwood lumber, to be able to load choice logs onto the bed of a truck in a safe and efficient manner.

SUMMARY OF THE INVENTION

The present invention is a truck bed mounted loading system which allows an individual to load large objects, such as logs, to be loaded into the bed of a truck. The loading system includes a pulling frame at one end of a load bed of the truck, and a ramp at the opposite end of the bed, such that a winch attached at an upper end of the pulling frame may be used to pull logs up the ramp. The pulling frame may be designed such that the winch is located at a point above a plane defined by the ramp, such that the winch both pulls a log up the ramp, as well as helps lift the nose of the log off the ramp to preclude the nose of the log from catching on transitions between the ramp and the ground and between the ramp and the bed of the truck. The pulling frame may be additionally formed such that support legs forming the frame may be mounted to the truck at opposite sides of the bed of the truck, to avoid interfering with logs being loaded, or the carrying capacity of the bed.

DETAILED DESCRIPTION OF THE PREFERRED EMBODIMENT

Figure 1:
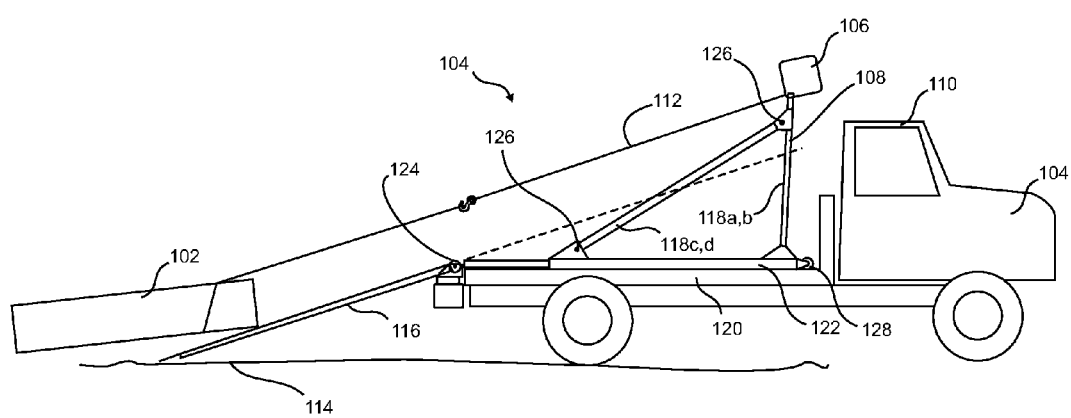
FIG. 1 shows a side view of a truck bed to which a pulling frame and ramp according to the present invention have been mounted, as well as a log being lifted by the pulling frame.

As shown in the Figures, in which like numerals are used to identify like elements, there is shown an embodiment of the present invention. As shown in FIG. 1, the present invention 100 may be used to pull logs 102, otherwise too long and too heavy to lift manually, into the bed or load platform of a pickup truck 104 or other motor vehicle. It may include a winch 106, mounted on a stand or frame 108 that is fastened in the bed of the pickup truck 104. The winch 106 may be mounted on the frame 108 at a height above the height of the cab 110 of the truck 104. This position allows for the winch cable 112 to pull upwards as well as forward, so the end of the log 102 does not dig into the ground 114 or ramp 116 as it is being pulled on the ground 114 and up the ramp 116, into the truck 104. The ramp 116 may be positioned and connected to the rear of the truck 104 at an angle in relation to the bed of the truck 104. The stand may have 4 legs 118a, 118b, 118c, and 118d. The front 2 legs 118a, 118b may support the winch. The rear two legs 118c, 118d may support the weight of the log 102 and the load of the log 102 pulling against the winch 106. The legs 118a, 118b, 18c, 118d may be positioned so they are spread apart, allowing room for the log(s) 104 that are pulled onto the bed of the truck 104 to be located between the legs 118a, 118b, 118c, 118d. The stand 108 may be built so that it distributes the weight of the log 102 on the entire length of the truck bed 120, such as through the inclusion of longitudinal bases or of rails 122 extending along the length of the bed 120. A roller 124, located at the end of the truck bed 120 opposite the winch 106 may facilitate the smooth transfer of weight of the log 102, as the log 102 travels onto the bed 120 of the truck 104 from the ramp 116. The machine may be assembled using removable pins 126, so it can be disassembled for ease of handling and for storage. The machine frame (stand) 108 may be adjustable in length, so it can be used in different length trucks. Wheels 128 may be provided at the front of the frame 108 to allow the frame 108 to be rolled onto the load bed of a vehicle more easily. The wheels 128 may be positioned such that when the frame 108 is tipped upwards, the wheels 128 contact the surface of the load bed to allow the frame 108 to be rolled, but also such that when level, the weight of the frame 108 rests on the load bed.

Figure 2:
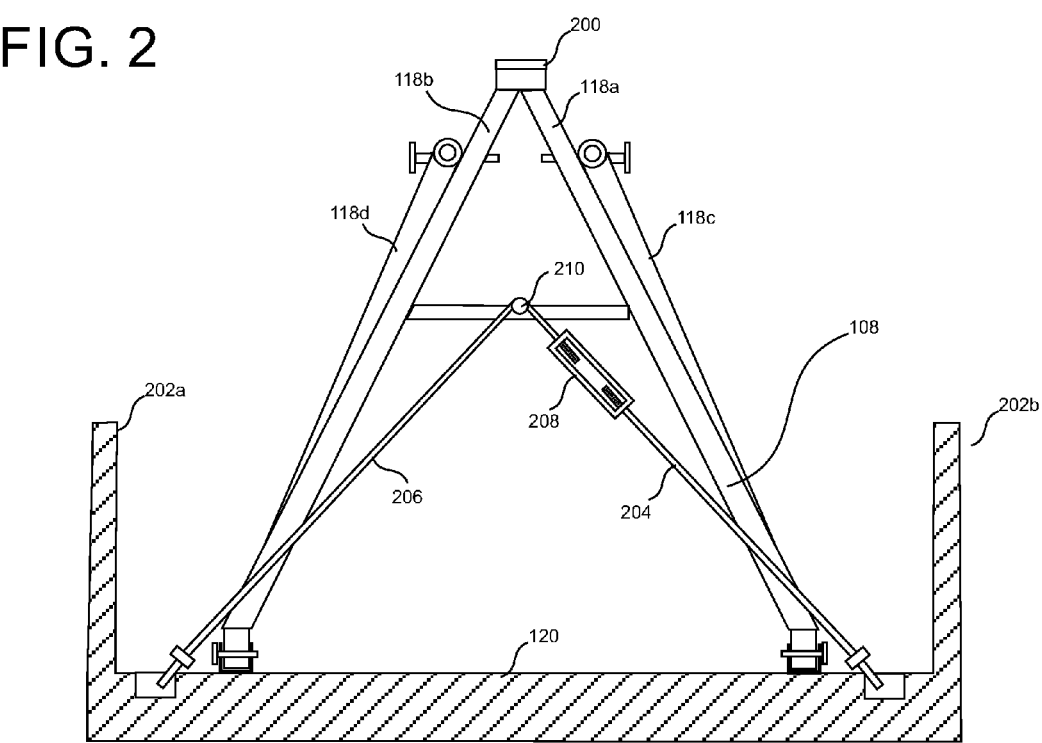
FIG. 2 shows a view of a pulling frame from the front according to the present invention.

As shown in FIG. 2, the legs 118a, 118b, 118c, 118d of the frame 108 may be angled from the outer edges 202a, 202b of the truck bed in towards the centerline of the truck bed 120, such that the area under the winch mounting point can remain clear to allow logs or other materials to be pulled under the frame to allow the full length of the truck bed to be used. A lateral stabilizer 204 may also be included, to limit the ability of the frame 108 to tip to either side as a result of a load at the winch mounting point 200, such as could result from pulling logs or other materials onto the truck bed 120. The lateral stabilizer 204 may comprise a steel cable 206 with a turnbuckle 208 to allow tightening of the cable 206, with the cable 206 attached to a point 210 on the frame 108, such that the frame cannot lift from the bed 120 of the truck 104, as would be required for the frame to tip. Additionally or alternately, dual cables may be used to additionally preclude lateral displacement of the legs and frame.

Figure 3:
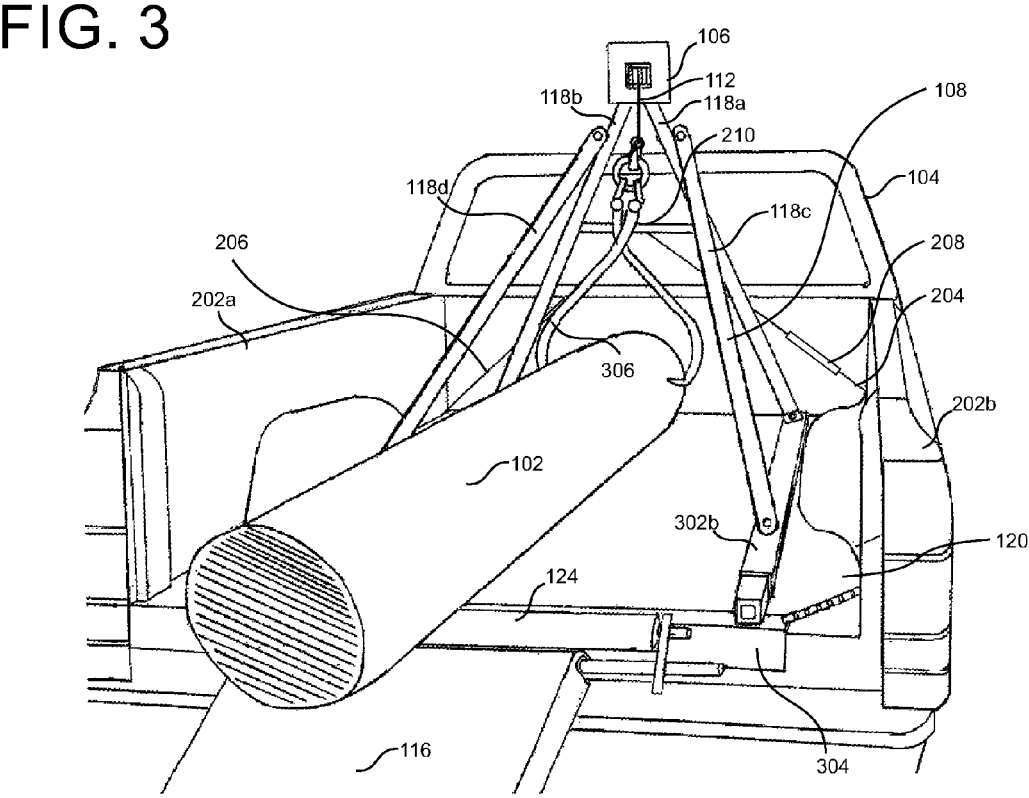
FIG. 3 shows a device for loading heavy objects according to the present invention showing the frame in a perspective view.

As shown in FIG. 3, the frame 108 may have longitudinal bases 302a, 302b that help distribute loads across a greater area of the bed of the truck. A crossbar 304 may be placed at the rear end of the frame 108 between the longitudinal bases 302a, 302b, to provide a structure for mounting the load assist roller 124. The crossbar 304 may additionally have engagement features for attaching a ramp at the rear of the truck bed in a proper position with respect to the roller 124. Alternately, the crossbar may be mounted to a hitch point on the rear of the truck, to utilize the strength inherent in such mounts. Positioning the roller 124 between the ramp and the bed of the truck allows the roller to reduce the force required to pull a log or other item across the edge created by the transition from the ramp to the bed of the truck, as well as limit damage to the log or other item as the log or other item transitions from being parallel to the ramp to parallel to the bed of the truck.

As shown in FIG. 1, the longitudinal bases 122 may be formed to be adjustable in length to allow the frame to be used in trucks having different length beds. The longitudinal rails may be formed by multiple sections of square wall tubing, such that a smaller tube may be sized to slide within a larger cross-section piece of tube, allowing the smaller section to telescope in and out of the larger section, allowing the distance from the front of the frame with respect to the rear end of the frame to be varied. Holes may be drilled through both the inner and outer tube sections, to allow the smaller tube section to be pinned to the larger tube section such that the front to rear length of the frame can be fixed.

Returning to FIG. 3, as the winch 106 is used to pull heavy objects, the frame must have sufficient strength to both hold the winch 106 in position, as well as to support vertical loads resultant from the object being pulled by the winch. Triangulating the front legs allows the load to be efficiently supported. Angling the rear legs from the front of the frame to a rearward position allows them to form columns to react loads resultant from the winch pulling a log, as well as to assist in positioning the winch mounting point. Triangulating the front legs 118a, 118b inward from the frame, but keeping them substantially vertical, allows vertical loads to be resolved. The engagement of the legs to the longitudinal bases may be formed such that the legs can be releasably engaged to the longitudinal bases, such that the frame can be quickly disassembled for removal from the truck, to allow the truck to be used for other purposes.

The frame must be retained to the motor vehicle 104 to further resolve the loads resultant from a log or other object being pulled into the bed of the truck. The frame may be pulled to the rear of the bed by a log or other object being loaded, but may also be pulled such that the frame may try to rotate about the rear end of the frame, particularly where the rear of the frame is mechanically retained to the rear of the bed. Accordingly, mounts for the frame may be made to suitable structure on the bed of the truck, such as to frame rails underlying the bed of the truck.

Although FIG. 3 shows the use of tongs 306 for grabbing a log being pulled, other devices, such as straps, may be used to grab the log or other object as appropriate.

Also as shown in FIG. 3, the winch 106 may be used via the cable 112 to pull a large log 102 into the bed of the pickup truck 104 by a single person, when the truck 104 is properly positioned with respect to the log 102. With a log 102 lined up with the ramp 116, the tongs or other attachment means may be secured to the log, with the tongs 306 attached to the winch 106 via the cable 112. As the cable 112 is pulled into the winch 106, the nose of the log 102 is pulled up the ramp 116 towards the winch 106. As the center of gravity of the log 102 crosses over the roller 124, the log 102 will tend to tip down onto the bed of the truck 104. Because of the tension on the log 102 through the cable 112, the rotation of the log 102 from the ramp 116 into the bed of the truck 102 is restrained, preventing the log from slamming into the bed of the truck as it crosses over the roller 124. Further, because the winch 106 is above the log 102 as it is pulled into the bed of the truck 104, the front bottom edge of the log 102 is pulled upwardly while the log 102 is pulled into the bed 120, reducing the likelihood of the front bottom edge of the log 102 hanging up on any irregularities in the bed of the truck 104 as it is pulled forward.

While the winch 106 is illustrated as being positioned atop the frame 108, the winch 106 may alternatively be located elsewhere, with the pulling line from the winch being passed over a pulley located adjacent the top of the frame to maintain a proper pulling direction.

Figure 4:
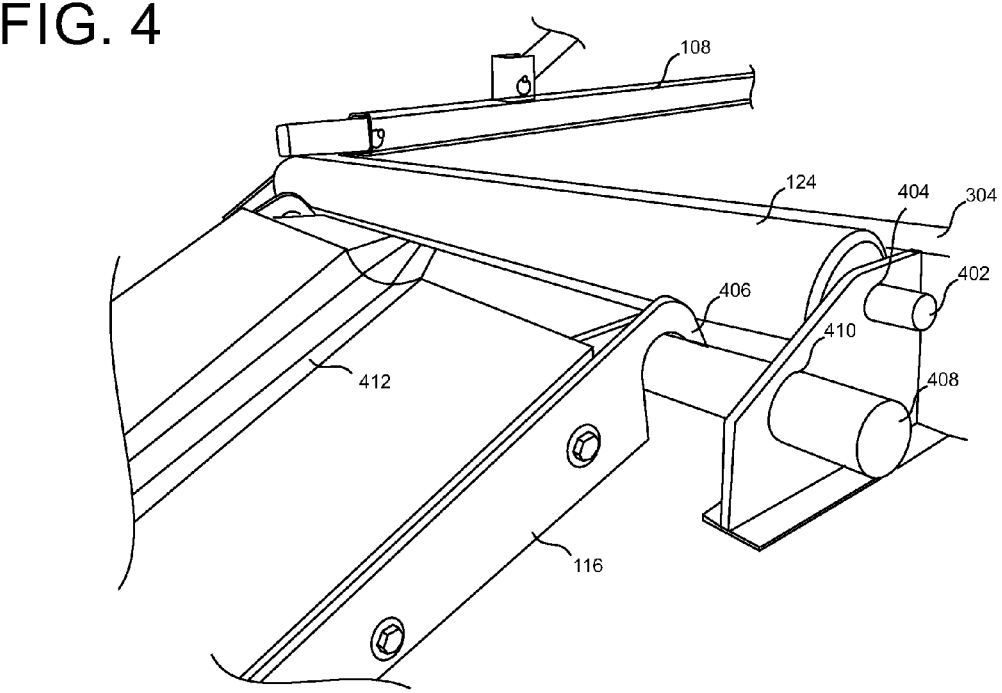
FIG. 4 shows the rear area of a device for loading heavy objects according to the present invention, highlighting potential configurations of the ramp and roller.

As shown in FIG. 4, both the roller 124 and the ramp 116 may be selectively engaged to the frame 108, such that they may be removed once a log or other heavy object has been loaded onto the bed of the truck. Because of the weight of the loaded object, it may not be feasible to lift the object to remove the roller 124 or ramp 116. To address this issue, the roller 124 may be mounted on an axle 402 which extends a distance greater than the width of the roller 124, such that the axle 124 rests in axle apertures 404 on either side of the roller 124. The axle apertures 404 may be formed such that the axle 402 may be removed from the apertures, such as by sliding the axle 402 to one side or the other, to allow the roller 124 to be disengaged from the crossbar 304, such that the roller 124 may be removed from the frame 108 to avoid any safety issues associated with the roller 124 being present. The ramp 116 may additionally be provided with hooks 406 on opposing sides of the top of the ramp 116, such that the ramp 116 may be engaged to a crosstube 408 at the rear of the frame 108 during loading operations, but removed to allow movement of the motor vehicle 104. The use of the hooks 406 may allow the ramp 116 to be removed if the loaded object is overhanging the ramp 116. Alternately, the crosstube 408 may be engaged in the crossbar 304 through crosstube apertures 410, such that the crosstube 408 may be withdrawn from the frame 108 by sliding it in one direction or the other, allowing the ramp 116 to be removed from the motor vehicle 104. By allowing removal of the crosstube 408, the ramp may be allowed to drop downward for removal, such as when a log or other object overhangs the end of the ramp, precluding sufficient upward movement of the top of the ramp in an upward direction a sufficient amount to clear the hooks. By removing the crosstube 408, the hooks no longer need to move upward to clear the crosstube 408, allowing removal of the ramp when loaded. Also as shown in FIG. 4, the ramp 116 may be formed with a channel 412 to assist in centering an object to be loaded on the ramp 116 during loading.

As shown in FIG. 4, the ramp may be provided with a central trough 412 which implements centering of an object being pulled up the ramp 116. The trough 412 may be in the form of an arcuate depression along the centerline of the ramp, extending from the bottom end of the ramp which rests on the ground, to the top of the ramp, where it is attached to the rear end of the truck or motor vehicle. The bottom end of the trough may be used to establish the force line of the pulling line, as the bottom of the trough defines the level above or below which the pulling line would pull the object against the ramp or upward from the ramp. While alignment of the pulling line above this force line is preferable, alignment slightly below the force line may not preclude the utility of the present invention.

Figure 5:
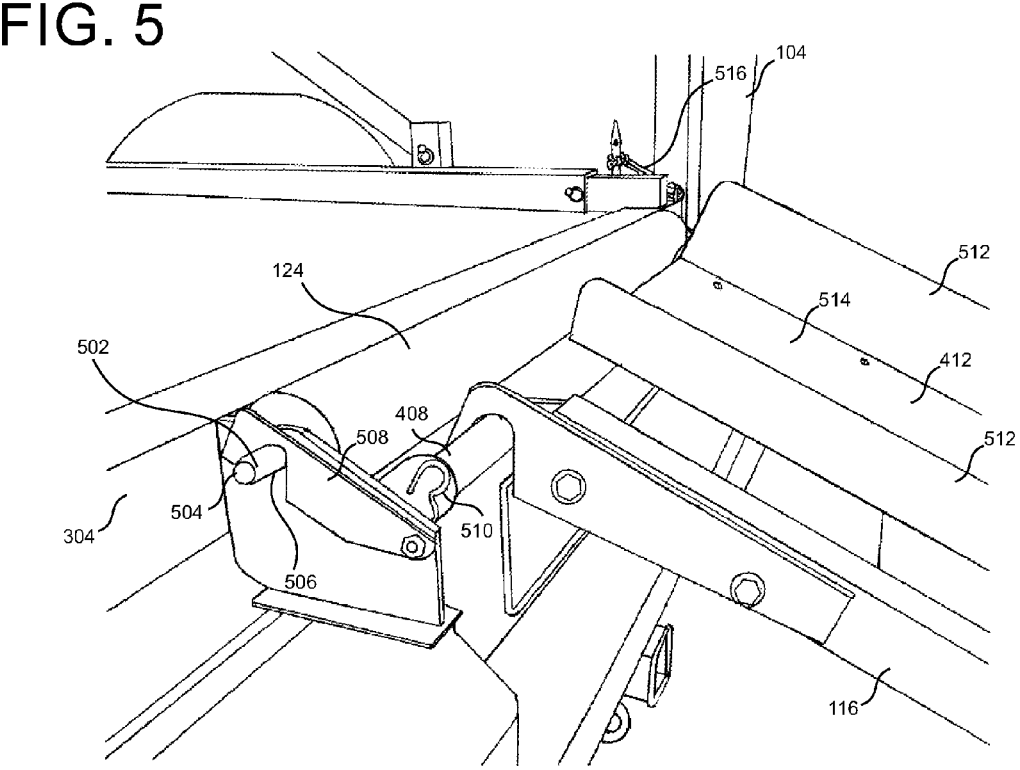
FIG. 5 shows the rear area of a device for loading heavy objects according to the present invention, highlighting potential configurations of the ramp and roller.

As shown in FIG. 5, the axle 502 for the roller may be formed by short axle sections or stub axles 504 extending from each side of the roller 124. One side of the roller 124 may be provided with a slot 506 for engaging with the crossbar 304, with a latch 508 extending over the top of the slot to retain an axle stub 504 in the slot 506. With the latch 508 raised, the stub axle 504 may be raised at the slot end, such that the opposing axle stub 502 can be withdrawn from an aperture (not visible, but similar to as shown in FIG. 4) to allow removal of the roller 124.

The crosstube 408 for the ramp may additionally be provided with a retainer 510 at one end, such as a hitch clevis, such that the crosstube will remain engaged in the crosstube apertures until the retainer 510 is removed.

Additionally, the trough 412 may be formed by the use of a pair of guide plates 512, which extend upward from a planar surface 514 of the ramp 116, such that an object being pulled up the ramp 116 will be urged to remain along the centerline of the ramp 116 by the guide plates 512. Finally, the frame 108 may further be retained to the motor vehicle through the use of retaining straps 516 which hold the frame 108 to the motor vehicle 104 at the rear of the frame 108, to restrain the frame 108 from sliding rearwards when an object is being loaded.

The present invention may be embodied in other specific forms without departing from the spirit or essential attributes of the invention. Accordingly, reference should be made to the appended claims, rather than the foregoing specification, as indicating the scope of the invention.

What is claimed is:

1. A device for loading heavy objects onto a load platform of a motor vehicle having a cab, said load platform having a load receiving end and a forward end, said load platform having a centerline extending between said front end and said load receiving end, said motor vehicle further having a ramp adjacent said receiving end for slidably loading large objects onto the load platform of the truck, said device comprising:

A frame for locating a pulling position at a location above the load platform of said motor vehicle, said pulling position being adjacent a plane formed by a top surface of said ramp, the frame comprising a first structural member and a second structural member extending from said load platform to adjacent said pulling position, said first and said second structural members being disposed on opposite sides of said centerline such that a load can be placed on said load platform between said structural members and below said pulling position, said frame further comprising a first longitudinal base and a second longitudinal base, said first longitudinal base connected to said first structural member, said first longitudinal base extending substantially parallel to said centerline, said first longitudinal base being offset from said centerline, said second longitudinal base connected to said second structural member, said second longitudinal base extending substantially parallel to said centerline, said second longitudinal base being offset from said centerline opposite said first longitudinal base, a rear crossmember extending between a rear end of said first longitudinal base and a rear end of said second longitudinal base, said rear end of said first longitudinal base disposed adjacent said load receiving end of said load platform, said rear end of said second longitudinal base disposed adjacent said load receiving end of said load platform, said frame further comprising a first brace and a second brace, said first brace extending from adjacent said rear end of said first longitudinal base to an upper end of said first structural member and said second brace extending from adjacent said rear end of said second longitudinal base to an upper end of said second structural member; and A winch comprising a pulling line connectable between said pulling position and the load to be loaded onto the load platform of the motor vehicle, the winch being mounted on the frame at a height above a top of the cab of the motor vehicle, one end of the pulling line including tongs or a strap configured to engage at least a portion of the load.

2. The device for loading heavy objects onto the load platform of a motor vehicle according to claim 1, wherein said winch is located adjacent said pulling position.

3. The device for loading heavy objects onto the load platform of a motor vehicle according to claim 1, wherein said winch comprises a motor for selectively reeling said pulling line towards the pulling position or paying said pulling line out from said pulling position.

4. The device for loading heavy objects onto the load platform of a motor vehicle according to claim 1, wherein said frame further comprises structure for retaining said frame to said load platform.

5. The device for loading heavy objects onto the load platform of a motor vehicle according to claim 1, further comprising mounting structures for engaging said frame to said load platform.

6. A device for loading heavy objects onto a load platform of a motor vehicle having a cab, said load platform having a load receiving end and a forward end, said load platform having a centerline extending between said front end and said load receiving end, said motor vehicle further having a ramp adjacent said receiving end for slidably loading large objects onto the load platform of the truck, said device comprising:

A frame for locating a pulling position at a location above the load platform of said motor vehicle, said pulling position being adjacent a plane formed by a top surface of said ramp, the frame comprising a first structural member and a second structural member extending from said load platform to adjacent said pulling position, said first and said second structural members being disposed on opposite sides of said centerline such that a load can be placed on said load platform between said structural members and below said pulling position, said frame further comprising a first longitudinal base and a second longitudinal base, said first longitudinal base connected to said first structural member, said first longitudinal base extending substantially parallel to said centerline, said first longitudinal base being offset from said centerline, said second longitudinal base connected to said second structural member, said second longitudinal base extending substantially parallel to said centerline, and said second longitudinal base being offset from said centerline opposite said first longitudinal base, a rear crossmember extending between a rear end of said first longitudinal base and a rear end of said second longitudinal base, said rear end of said first longitudinal base disposed adjacent said load receiving end of said load platform, said rear end of said second longitudinal base disposed adjacent said load receiving end of said load platform; and A winch comprising a pulling line connectable between said pulling position and the load to be loaded onto the load platform of the motor vehicle, said winch being mounted on said frame at a height above a top of the cab of the motor vehicle, one end of the pulling line including tongs or a strap configured to engage at least a portion of the load, wherein said ramp is releasably engageable to said rear crossmember.

7. A device for loading heavy objects onto a load platform of a motor vehicle having a cab, said load platform having a load receiving end and a forward end, said load platform having a centerline extending between said front end and said load receiving end, said motor vehicle further having a ramp adjacent said receiving end for slidably loading large objects onto the load platform of the truck, said device comprising:

A frame for locating a pulling position at a location above the load platform of said motor vehicle, said pulling position being adjacent a plane formed by a top surface of said ramp, the frame comprising a first structural member and a second structural member extending from said load platform to adjacent said pulling position, said first and said second structural members being disposed on opposite sides of said centerline such that a load can be placed on said load platform between said structural members and below said pulling position, said frame further comprising a first longitudinal base and a second longitudinal base, said first longitudinal base connected to said first structural member, said first longitudinal base extending substantially parallel to said centerline, said first longitudinal base being offset from said centerline, said second longitudinal base connected to said second structural member, said second longitudinal base extending substantially parallel to said centerline, and said second longitudinal base being offset from said centerline opposite said first longitudinal base; and A winch comprising a pulling line connectable between said pulling position and the load to be loaded onto the load platform of the motor vehicle, said winch being mounted on said frame at a height above a top of the cab of the motor vehicle, one end of the pulling line including tongs or a strap configured to engage at least a portion of the load, Wherein said longitudinal bases are adjustable in length, and wherein said longitudinal bases comprise a first portion and a second portion, wherein said second portion fits within said first portion, and is telescopically adjustable to vary the length of the longitudinal base.

8. The device for loading heavy objects onto the load platform of a motor vehicle according to claim 7, the frame further comprising a rear crossmember extending between a rear end of said first longitudinal base and a rear end of said second longitudinal base, said rear end of said first longitudinal base disposed adjacent said load receiving end of said load platform, said rear end of said second longitudinal base disposed adjacent said load receiving end of said load platform.

* * * * *